(12) United States Patent
Guan et al.

(10) Patent No.: US 11,688,144 B2
(45) Date of Patent: Jun. 27, 2023

(54) SELF GUIDANCE BASED ON DIMENSIONAL RELATIONSHIP (71) Applicant: INTERNATIONAL BUSINESS MACHINES CORPORATION, Armonk, NY (US)

(72) Inventors: Li Li Guan, Beijing (CN); Peng Tang, Beijing (CN); Zhe Yan, Beijing (CN); Rong Zhao, Beijing (CN); Hao Jia Li, Beijing (CN); Li Bo Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 45 days.

(21) Appl. No.: 17/304,177

(22) Filed: Jun. 16, 2021

(65) Prior Publication Data
US 2022/0406019 A1 Dec. 22, 2022

(51) Int. Cl.
*G06T 7/73* (2017.01)
*G06T 19/00* (2011.01)
(Continued)

(52) U.S. Cl.
CPC ............ *G06T 19/006* (2013.01); *G06T 7/248* (2017.01); *G06T 7/33* (2017.01); *G06T 7/74* (2017.01);
(Continued)

(58) Field of Classification Search
None
See application file for complete search history.

(56) References Cited

U.S. PATENT DOCUMENTS

| 2018/0101932 A1 | 4/2018 | Kwon |
| 2018/0260613 A1 | 9/2018 | Gao |

(Continued)

FOREIGN PATENT DOCUMENTS

CN 110751735 A 2/2020

OTHER PUBLICATIONS

Li et al., "PU-GAN: a Point Cloud Upsampling Adversial Network", arXiv:1907..10844v1 [cs.CV] Jul. 25, 2019, pp. 1-10.
(Continued)

*Primary Examiner* — Steven Z Elbinger
(74) *Attorney, Agent, or Firm* — Kristofer Haggerty (57) ABSTRACT

A method, a computer program product, and a computer system guide a user through dimensional relationships. The method includes receiving a plurality of images of a unit of a perspective of a user. When a number of corresponding three-dimensional points between a current image and a previous image is less than a registration threshold to perform a three-dimensional registration operation, the method includes performing a three-dimensional data augmentation operation based on two-dimensional data from the current image and the previous image to generate extended corresponding three-dimensional points. The method includes determining a three-dimensional transform function between the current image and the previous image based on the extended corresponding three-dimensional points. The method includes generating annotations to be shown for the unit in the current image based on the three-dimensional transform function, the annotations being shown as a virtual rendering in a mixed reality environment viewed by the user.

20 Claims, 5 Drawing Sheets

(51) Int. Cl.
 *G06T 7/33* (2017.01)
 *G06T 7/246* (2017.01)
 *G09B 19/00* (2006.01)
 *G06T 7/80* (2017.01)

(52) U.S. Cl.
 CPC .............. *G06T 7/80* (2017.01); *G09B 19/003* (2013.01); *G06T 2207/30241* (2013.01); *G06T 2219/004* (2013.01)

(56) References Cited

U.S. PATENT DOCUMENTS

| | | | |
|---|---|---|---|
| 2019/0026956 A1 | 1/2019 | Gausebeck | |
| 2019/0122027 A1* | 4/2019 | Prideaux-Ghee | G06T 7/248 |
| 2020/0090409 A1* | 3/2020 | Fink | G06T 7/579 |
| 2020/0160487 A1 | 5/2020 | Kanzawa | |
| 2020/0336706 A1 | 10/2020 | Schmirler | |
| 2021/0241435 A1* | 8/2021 | Zhou | G06T 7/50 |
| 2022/0292811 A1* | 9/2022 | Horikawa | G06V 10/764 |

OTHER PUBLICATIONS

Lin et al., "A novel point cloud registration using 2D image features", EURASIP Journal on Advances in Signal Processing 2017:5, https://asp-eurasipjournals.springeropen.com/articles/10.1186/s13634-016-0435-y, (2017), pp. 1-12.

Lyu et al., "Learning to Segment 3D Point Clouds in 2D Image Space", CVPR2020, Computer Vision Foundation, 2020, pp. 1-10.

Mell et al., "The NIST Definition of Cloud Computing", National Institute of Standards and Technology, Special Publication 800-145, Sep. 2011, pp. 1-7.

Yifan et al., "Patch-based Progressive 3D Point Set Up Upsampling", arXiv:1811.11286v3 [cs.CV] Mar. 21, 2019, pp. 1-10.

Yu et al., "EC-Net: an Edge-aware Point set Consolidation Network", arXiv:1807.06010v1 [cs.CV] Jul. 16, 2018, pp. 1-28.

Yu et al., "PU-Net: Point Cloud Upsampling Network", https://yulequan.github.io/pu-net/index.html, 2018, (accessed Mar. 22, 2021), pp. 1-5.

* cited by examiner

SELF GUIDANCE BASED ON DIMENSIONAL RELATIONSHIP

BACKGROUND

The exemplary embodiments relate generally to self guidance, and more particularly to generating annotations that are shown to a user in a mixed reality environment while performing an operation on a unit.

In many different fields, professionals or users may perform procedures linked to various objects such as assets or other units. For example, technicians may perform technical procedures on electronic and/or mechanical objects. In the manufacturing industry, technicians may need to master the ability to maintain, repair, and/or operate these assets and perform such jobs frequently. During the process of performing a task, the technician may encounter a problem and require assistance. If an expert or other technician familiar with the task is not available, the task may remain unfinished that may halt use of the asset. When relying on oneself, the user may refer to guides to provide information on how to resolve an issue that may arise with the unit. This may be of particular importance when the issue that arose is not one that the user has previously encountered or on a unit that is unfamiliar to the user. However, applying steps to resolve an issue as provided in a guide (e.g., a user manual) may be insufficient for the user to properly identify the correct components, identify the correct operation, etc.

SUMMARY

The exemplary embodiments disclose a method, a computer program product, and a computer system for guiding a user through dimensional relationships. The method comprises receiving a plurality of images from a user device utilized by a user performing a task on a unit where the images correspond to a perspective that the user is viewing the unit. The method comprises determining whether a current image of the images and a previous image of the images include a number of corresponding three-dimensional points that is at least a registration threshold to perform a three-dimensional registration operation. As a result of the number of corresponding three-dimensional points being less than the registration threshold, the method comprises performing a three-dimensional data augmentation operation based on two-dimensional data from the current image and the previous image to generate extended corresponding three-dimensional points. The method comprises determining a three-dimensional transform function between the current image and the previous image based on the extended corresponding three-dimensional points. The method comprises generating annotations to be shown for the unit in the current image based on the three-dimensional transform function, the annotations being shown as a virtual rendering in a mixed reality environment viewed by the user.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

The exemplary embodiments are directed to a method, computer program product, and system for providing annotations to a user in a mixed reality enviroment to support self guidance in performing a task on a unit. The exemplary embodiments provide a mechanism in which a user utilizing a mixed reality environment while performing a task on a unit or asset is provided annotations of the unit and/or the task so that the user may perform the task in a self guided manner. In generating the annotations, the exemplary embodiments may perform a continuous three-dimensional registration for self guidance based on a two-dimensional and a three-dimensional relationship of the unit. Even with a relatively small amount of information of the unit, the exemplary embodiments may utilize a two-dimensional image and extrapolate three-dimensional information through an augmentation mechanism so that annotations may be provided in the mixed reality environment of a three-dimensional environment. Key benefits of the exemplary embodiments may include a self guidance approach to maintain, repair, and/or operate the unit by utilizing augmented reality in a mixed reality environment through tracking the unit, even when only a small amount of data is capable of being obtained from only a single view of the target unit. Detailed implementation of the exemplary embodiments follows.

Conventional approaches have provided a variety of mechanisms for augmented reality solutions and determining three-dimensional information. With regard to self guidance and utilizing augmented reality, a conventional approach may provide peer guidance in which a first user such as a peer provides assistance to a second user requesting the assistance where information included in an augmented reality display is based on alignment with a three-dimensional world that is applied to camera coordinates. With regard to dimensionality, a conventional approach may employ three-dimensional data predicted from two-dimensional images using neural networks where the three-dimensional data relies on determining depth data alone. Another conventional approach may register three-dimensional data with two-dimensional image data where images are captured with different devices and a capture timing gap is used. A further conventional approach tracks objects through two-dimensional image data captured by a camera and three-dimensional image data captured by a lidar device is used. However, the conventional approaches do not provide a self guidance mechanism for users without requiring a concurrent assistance of another user and/or provide a three-dimensional data augmentation from two-dimensional data. The conventional approaches also do not address situations involving a low number of detected three-dimensional points where three-dimensional registration is not probable and/or when a target unit is moving where a three-dimensional model is capable of properly tracking.

The exemplary embodiments are configured to provide self guidance through a continuous three-dimensional registration based on a two-dimensional and three-dimensional relationship in which three-dimensional data is augmented. The exemplary embodiments may compensate for conditions involving a relatively low amount of information that may otherwise prevent three-dimensional registration as well as conditions involving a target unit in motion. As will be described in further detail below, the exemplary embodiments may perform continuous tracking of the unit for which the user is performing the task that provide information for the three-dimensional registration as well as perform augmentation operations when there is insufficient three-dimensional points from which to perform three-dimensional registration accurately.

The exemplary embodiments are described with particular reference to self guidance for a user to perform a task on a unit. However, the exemplary embodiments may be utilized and/or modified for any task, operation, or procedure where a user may wish to perform alone on any unit, whether or not the unit is non-animate.

Figure 1:
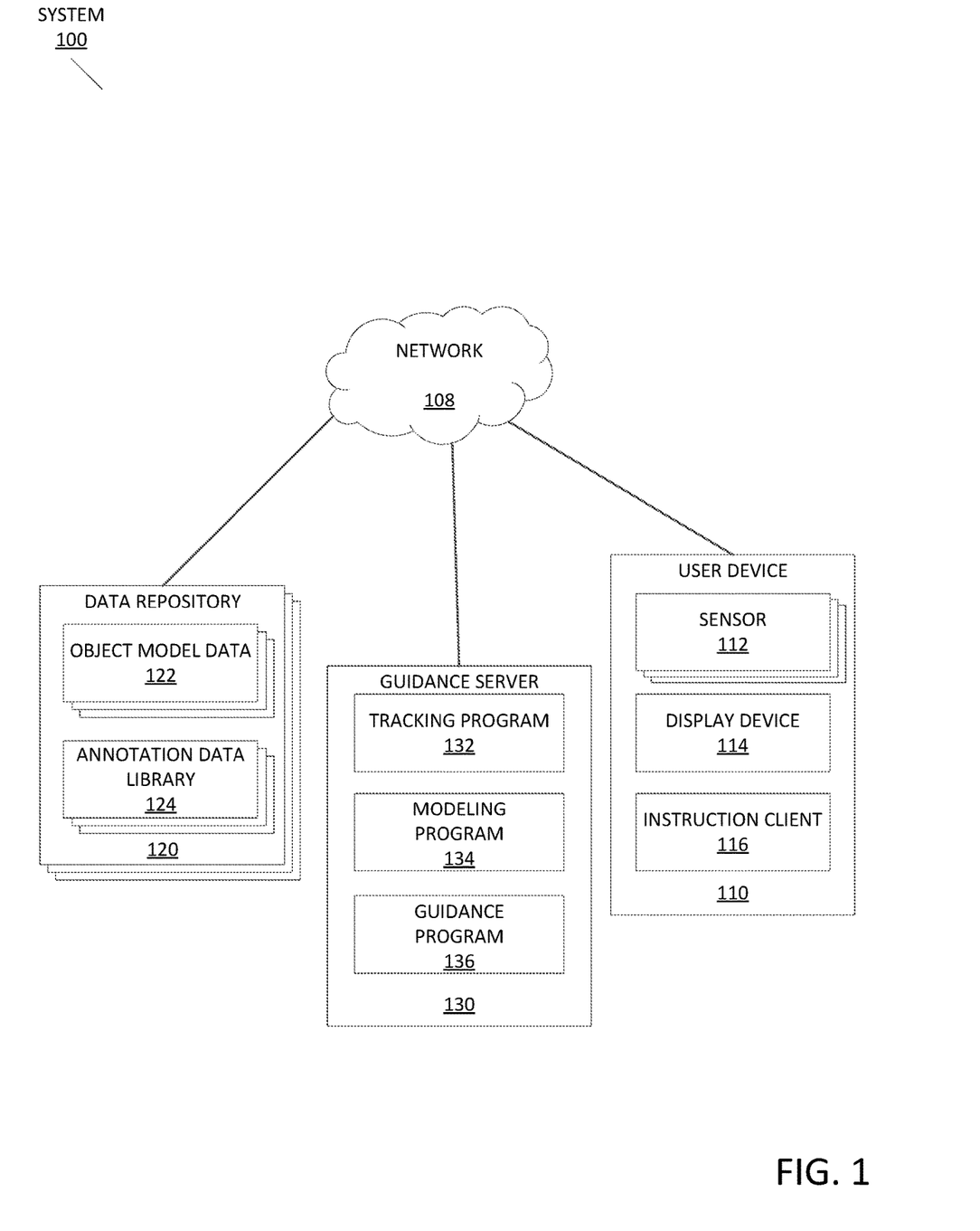
FIG. 1 depicts an exemplary schematic diagram of a self-guidance system 100, in accordance with the exemplary embodiments.

FIG. 1 depicts a self-guidance system 100, in accordance with the exemplary embodiments. According to the exemplary embodiments, the self-guidance system 100 may include a user device 110, one or more data repositories 120, and a guidance server 130, which may all be interconnected via a network 108. While programming and data of the exemplary embodiments may be stored and accessed remotely across several servers via the network 108, programming and data of the exemplary embodiments may alternatively or additionally be stored locally on as few as one physical computing device or amongst other computing devices than those depicted.

In the exemplary embodiments, the network 108 may be a communication channel capable of transferring data between connected devices. Accordingly, the components of the self-guidance system 100 may represent network components or network devices interconnected via the network 108. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc. which may be implemented as an intranet network, a local area network (LAN), a wide area network (WAN), or a combination thereof. In further embodiments, the network 108 may be a Bluetooth network, a WiFi network, or a combination thereof. In yet further embodiments, the network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices. For example, the network 108 may also represent direct or indirect wired or wireless connections between the components of the self-guidance system 100 that do not utilize the network 108.

In the exemplary embodiments, the user device 110 may include one or more sensors 112, a display device 114, and a demonstration client 116, and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an Internet of Things (IoT) device, or any other electronic device or computing system capable of receiving and sending data to and from other computing devices. While the user device 110 is shown as a single device, in other embodiments, the user device 110 may be comprised of a cluster or plurality of computing devices, in a modular manner, etc., working together or working independently. The user device 110 is described in greater detail as a hardware implementation with reference to FIG. 3 (e.g., data processing according to the exemplary embodiments being performed by processor 02), as part of a cloud implementation with reference to FIG. 4 (e.g., the device 110 according to the exemplary embodiments being represented by the laptop computer 54C), and/or as utilizing functional abstraction layers for processing with reference to FIG. 5 (e.g., workload layer 90 including guidance processing 96 according to the exemplary embodiments). The user device 110 may be utilized by a user who is performing a task on a unit or asset in a self guidance manner (e.g., without instruction from another user).

In the exemplary embodiments, the one or more sensors 112 may generate various types of information associated with how a user is viewing the unit on which a task is to be performed in a self guided manner. In the exemplary embodiments, the one or more sensors 112 may generate various types of information associated with sensory reception of the user. For example, the sensors 112 may include an imager such as a camera. In a particular exemplary embodiment, the camera may be a head mounted camera to provide an egocentric view from the perspective of the user. The camera may generate images or sequential images (i.e., a video) that provide a scene that the user is viewing. Accordingly, with the egocentric positioning, the camera may capture images that represent a view or scene that is seen by the user.

In another example, the sensors 112 may include components configured to generate motion data such as orientation, position, movement, etc. For example, the sensors 112 may include an accelerometer, a gyroscope, etc. As will be described in further detail below, such ones of the sensors 112 may be used in determining trajectory information or other motion related information that may be used in three-dimensional registration operations. In a further example, the sensors 112 may include a microphone configured to receive any auditory output from the user. For example, the microphone may capture verbal expressions or instructions such as when the user is prompted to provide an input. However, one skilled in the art will understand that any input device may be used for such a functionality. For example, the sensors 112 may include eye trackers configured to determine a location on which the user's eyes are focusing in another manner of receiving an input from the user.

In the exemplary embodiments, the display device 114 may be any device configured to show a mixed reality environment to the user. For example, the display device 114 may be augmented reality glasses worn over the user's eyes. As one skilled in the art will understand, the augmented reality glasses may allow for a real world scene to be viewed (e.g., as if the augmented reality glasses were not worn) but still allow for a virtual rendering to be shown as an overlay to the real world scene. As the view of the real world scene corresponds to how the virtual rendering is positioned, the camera (e.g., of the sensors 112) may be in a fixed positioned relative to the augmented reality glasses (e.g., attached to the glasses). In another example, the display device 114 may be a camera based display in which a camera having a field of view captures and shows a real world scene in a display area of the user device 110. A virtual rendering may then be superimposed over the real world scene in the display area. Those skilled in the art will appreciate that the display device 114 of the exemplary embodiments may utilize a variety of manners to provide a mixed reality environment for the user.

In the exemplary embodiments, the instruction client 116 may act as a client in a client-server relationship and may be a software, hardware, and/or firmware based application capable of creating a mixed reality environment shown to a user using rendering data provided via the network 108. In embodiments, the instruction client 116 may provide a user interface in which the user may initiate a session in which the rendering data is received and the mixed reality environment is created for the user to perform a task on a unit with annotations shown on the unit as well as interact with one or more components of the self-guidance system 100, and utilize various wired and/or wireless connection protocols for data transmission and exchange associated with data used for modifying a version of an application, including Bluetooth, 2.4 gHz and 5 gHz internet, near-field communication, Z-Wave, Zigbee, etc.

As will be described in detail below with regard to the guidance server 130, the instruction client 116 may exchange data with the guidance server 130 (e.g., the data generated by the sensor 112 and/or the display device 114) and receive rendering data that is used in creating the mixed reality environment on the display device 114. The instruction client 116 may also be configured to receive inputs from the user that is formatted and exchanged with further components of the self-guidance system 100.

In the exemplary embodiments, the data repository 120 may include one or more object model data 122 and one or more annotation data libraries 124 and may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of storing, receiving, and sending data to and from other computing devices. While the data repository 120 is shown as a single device, in other embodiments, the data repository 120 may be comprised of a cluster or plurality of electronic devices, in a modular manner, etc., working together or working independently. While the data repository 120 is also shown as a separate component, in other embodiments, the data repository 120 may be incorporated with one or more of the other components of the self-guidance system 100. For example, the data repository 120 may be incorporated in the guidance server 130. Thus, access to the data repository 120 by the guidance server 130 may be performed locally. The data repository 120 is described in greater detail as a hardware implementation with reference to FIG. 3, as part of a cloud implementation with reference to FIG. 4, and/or as utilizing functional abstraction layers for processing with reference to FIG. 5.

In the exemplary embodiments, the object model data 122 may include three-dimensional models of units that are involved in performing various tasks. The three-dimensional models of units may be used in segmenting an image and identifying portions in the image where a portion may correspond to a desired unit captured in the image. In another manner, the three-dimensional models may be used in determining what constitutes foreground versus background such that irrelevant portions may be omitted from processing operations. Each of the three-dimensional models of the object model data 122 may be respectively associated with one or more tasks and with one or more units.

In the exemplary embodiments, the annotation data library 124 may include a plurality of different annotation related information. The annotation data library 124 may be built through various techniques and processes. For example, the annotation data library 124 may process historical annotation libraries, network searches, manual entries, etc. The annotation data library 124 may also process such data using optical character recognition (OCR), semantic analysis, object detection, etc. In processing this data, the annotation data library 124 may be build using model-related information, user-related information, field-related information, etc. The model-related information may include, for example, instructions for tasks, installation guides, points prone to problems, frequently asked questions, corresponding solutions when problems occur, etc. The user-related information may include, for example, user profiles, backgrounds of users, related skill levels of users, historical query records, etc. The field-related information may include, for example, technology growth routes, related models, common solving ides, etc. By building up the annotation data library 124 in this manner, the annotation data library 124 may provide appropriate annotations that may be included in the rendering data to be shown in the mixed reality environment that is generated for the user performing the task with self guidance.

In the exemplary embodiments, the guidance server 130 may include a tracking program 132, a modeling program 134, and a guidance program 136, and act as a server in a client-server relationship with the instruction client 116 as well as be in a communicative relationship with the data repository 120. The guidance server 130 may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of receiving and sending data to and from other computing devices. While the guidance server 130 is shown as a single device, in other embodiments, the guidance server 130 may be comprised of a cluster or plurality of computing devices, working together or working independently. While the guidance server 130 is also shown as a separate component, in other embodiments, the operations and features of the guidance server 130 may be incorporated with one or more of the other components of the self-guidance system 100. For example, the operations and features of the guidance server 130 may be incorporated in the user device 110. The guidance server 130 is described in greater detail as a hardware implementation with reference to FIG. 3 (e.g., data processing according to the exemplary embodiments being performed by processor 02), as part of a cloud implementation with reference to FIG. 4 (e.g., the device 110 according to the exemplary embodiments being represented by the desktop computer 54B), and/or as utilizing functional abstraction layers for processing with reference to FIG. 5 (e.g., workload layer 90 including guidance processing 96 according to the exemplary embodiments).

In the exemplary embodiments, the tracking program 132 may be a software, hardware, and/or firmware application configured to determine a perspective of a scene being viewed by the user utilizing the user device 110. The tracking program 132 may receive data from the sensor 112 of the user device 110 to determine the scene as viewed by the user. For example, the images captured by the imager may show the scene that the user is viewing. The images may also be used in determining a perspective that the scene including the unit on which the task is to be performed is being viewed. Based on the selected task and/or the unit, the tracking program 132 may utilize, for example, the object model data 122 involved in performing the task in determining the manner in which to generate rendering data to include the annotations.

The tracking program 132 may also be configured to instruct the user in maintaining a position where a target unit remains within a capture area of the imager in creating the images. For example, the user may be distracted or beginning looking elsewhere such that the images no longer include the unit for which the task is to be performed. When the tracking program 132 determines that the unit is no longer being captured in the images, the tracking program 132 may instruct the user to return to a location where the unit is or reposition the sensor 112 for the unit to be captured in the images. Based on trajectory information, analysis of the area that the user is located, etc., the tracking program 132 may also provide instruction as to the manner in which to relocate or reposition for the unit to return to frame for the images to include the unit.

The tracking program 132 may further be configured to continuously track the user, the scene that the user is viewing, and/or the unit while the user is performing the task. That is, the tracking program 132 may continue to receive images from the sensor 112 during a time that the user is performing the task. The tracking program 132 may determine tracking information such as a trajectory in which the user is viewing the target unit. As will be described in further detail below, the trajectory may be used in performing three-dimensional registration operations.

In the exemplary embodiments, the modeling program 134 may be a software, hardware, and/or firmware application configured to perform object analysis and dimensional operations. As will be described in further detail below, the modeling program 134 may utilize the tracking information and the images to perform object segmentation as well as other object analysis operations. The modeling program 134 may further perform three-dimensional augmentation operations and three-dimensional registration operations. Based on these operations, the modeling program 134 may determine annotation point coordinates such as a perspective that a unit is being viewed by the user.

In the exemplary embodiments, the guidance program 136 may be a software, hardware, and/or firmware application configured to receive the annotation point coordinate information and generate/transmit corresponding annotations to be shown to the user in the mixed reality environment on the display device 114.

The guidance server 130 may further be configured to incorporate additional features in ultimately generating the annotations for the unit in performing the task by the user with self guidance. For example, the guidance server 130 may determine when the unit is being at least partially occluded by an object, the user, etc. The guidance server 130 may modify an annotation for a component of the unit that is being blocked (e.g., utilize a different color, a dashed letter/numbering, etc.). In another example, the guidance server 130 may determine when a tool or other device may be used in the task. The guidance server 130 may utilize the exemplary embodiments in generating the annotations to dynamically include further annotations for the tool that is identified in the images and for the task while the tool is being used. In a further example, the annotations may indicate the components of the unit. Thus, the annotations may be provided for the user to easily identify the components of the unit so that the user may perform the task. The annotations may also indicate the steps of the task. Thus, the annotations may be provided for the user to perform the steps (e.g., directions to move or turn a component, indicating a port for which a cable is to be plugged in, etc.).

Figure 2:
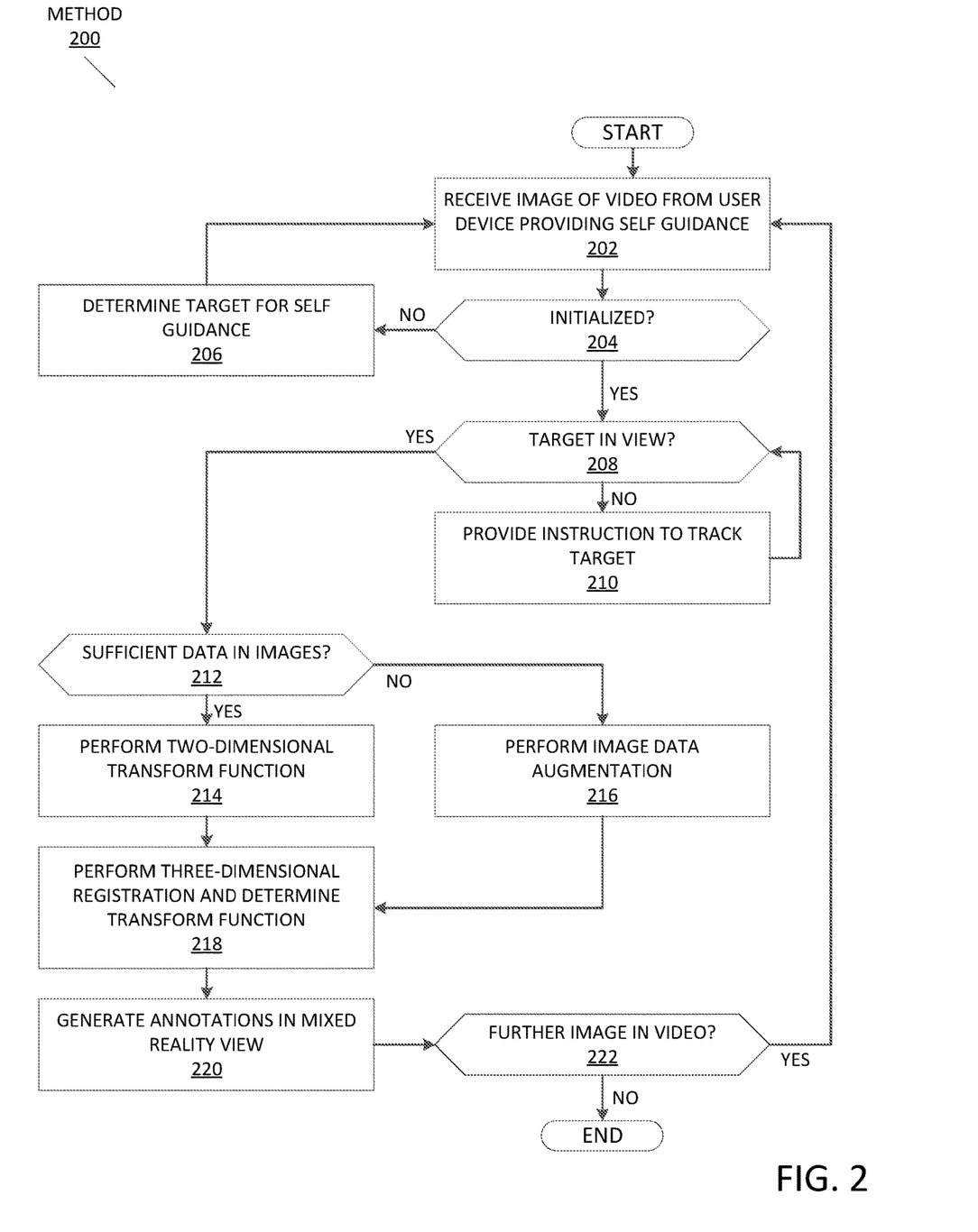
FIG. 2 depicts an exemplary flowchart of a method illustrating the operations of a guidance server of the self-guidance system 100 in guiding a user through dimensional relationships, in accordance with the exemplary embodiments.

FIG. 2 depicts an exemplary flowchart of a method 200 illustrating the operations of the guidance server 130 of the self-guidance system 100 in guiding a user through dimensional relationships, in accordance with the exemplary embodiments. The method 200 may relate to operations that are performed by the tracking program 132, the modeling program 134, and the guidance program 136 based on data gathered by the sensors 112. The method 200 will be described from the perspective of the guidance server 130.

The method 200 may relate to a set of operations that is performed while a task is being or about to be performed by a user on a unit. While performing the task, the user may be provided annotations in a mixed reality environment viewable by the user of a real world scene including the unit. The annotations may be selected from the annotation data library 124. As described above, the annotation data library 124 may include a variety of different annotations that may be built for various units, tasks, users, etc. The annotation data library 124 may also be built using a variety of different types of data including model-related information, user-related information, field-related information, etc. In this manner, the annotation data library 124 may include annotations that may be objectively provided (e.g., a standard set of annotations for a given task on a selected unit) or personalized for the user (e.g., a modified set of annotations for a given task on a selected unit based on a user's expertise on the task and/or unit).

With regard to a relative timing to the method 200, the annotation data library 124 may be built at a variety of different times. For example, the annotation data library 124 may be built prior to the task being performed. The annotation data library 124 may be based on historical information that is selected at the time the annotation data library 124 is built. In another example, the annotation data library 124 may be built when required such as when the annotations are to be generated and provided to the user performing the task on the unit (e.g., during the method 200). The annotation data library 124 may also be updated at a variety of times. For example, the annotation data library 124 may be updated at predetermined time intervals, after a predetermined number of iterations of the method 200 (e.g., for a given task and/or a given unit), at personalized dynamic times (e.g., when a specific user has performed a task), etc. The method 200 will be described based on the annotation data library 124 being prepared prior to the user performing the task (e.g., before the method 200).

The guidance server 130 may receive images of a video from the user device 110 utilized by a user who is or will be performing a task with self guidance (step 202). As described above, the user device 110 may include a sensor 112 that may be an imager. The imager may capture images in sequence of a scene that the user may be viewing. When the task is to be performed, the user may activate the imager and/or an application on the user device 110 that initiates a transfer of the images to the guidance server 130. Based on the images being received, the guidance server 130 may process the images and perform subsequent operations.

The guidance server 130 may determine whether the process has been initialized (decision 204). That is, the guidance server 130 may determine whether one of the images being received is an initial image for which the process results in providing annotations. As the guidance server 130 may provide a substantially automated manner of providing annotations, the guidance server 130 may determine the unit that is being targeted by the user. In receiving the images, the guidance server 130 may determine whether an image being received is a first image for the process according to the exemplary embodiments that is indicative of a new session for which annotations are to be provided. Being a first image and a new session, the guidance server 130 may acquire the target unit such that corresponding annotations may be provided specifically for the unit.

As a result of the image being processed being indicative of initializing the process (e.g., the process is not initialized) (decision 204, "NO" branch), the guidance server 130 may determine the target unit for which the user is performing the task with self guidance (step 206). In determining the target, the guidance server 130 may perform object segmentation and provide object bounding boxes for each identified object in the image. In an exemplary embodiment, the guidance server 130 may show the bounding boxes positioned over corresponding objects such that the user may see the bounding boxes in a mixed reality enviroment of the real world scene. The user may subsequently provide an input to indicate a selected one of the bounding boxes (e.g., using an input device), and consequently, the guidance server 130 may determine the target unit for which annotations are to be provided. In another exemplary embodiment, the guidance server 130 may utilize data from the sensors 112 (e.g., eye tracker) to determine where the user is viewing within the real world scene. Through correspondences to the image for which bounding boxes are generated, the guidance server 130 may determine which of the bounding boxes corresponds to the location in the real world scene and the image to consequently determine the target unit for which annotations are to be provided.

In utilizing the bounding boxes, the guidance server 130 may perform an additional operation to more efficiently perform subsequent operations. For example, the guidance server 130 may utilize the bounding boxes to filter out non-target areas. That is, a background portion or other objects that are not in consideration may be omitted from processing. The other objects may be determined in a variety of different ways such as identifying a user expertise to omit units that are irrelevant to that expertise. When the bounding box is selected, the guidance server 130 may further filter out the remainder of the foreground as the target unit is determined. However, if a target unit is to change during the course of the process, the guidance server 130 may be configured to determine the target unit at any given moment.

As a result of the image being processed being indicative of the process already initialized (decision 204, "YES" branch), the guidance server 130 may determine whether the target unit is in view (decision 208). Although the unit has been identified for the process, the user may continue to move or change a perspective that may result in the unit moving at least partially out of frame of the imager. Thus, the images being received may no longer include or partially omit the unit. As a result of the unit not being in view either entirely or partially (decision 208, "NO" branch), the guidance server 130 may provide instructions for the user to continue tracking the target unit (step 210). For example, the guidance server 130 may generate text or visual instructions that are shown in a virtual rendering in the mixed reality environment. The text instructions may indicate a direction and/or rotation for the unit to return into view. The visual instructions may be arrows that indicate a direction and/or rotation for the unit to return into view. In another example, the guidance server 130 may generate other sensory instructions such as auditory instructions, haptic feedback, etc.

The method 200 may include additional operations and/or options that may be available for the user. For example, the target unit may move out of frame because the user has selected another unit for the process. In this manner (e.g., after step 210), the user may provide an input or the exemplary embodiments may automatically determine that the process with a selected target unit is suspended or concluded and another process with a further target unit is to started or continued. In a particular implementation, the user may be provided an option to modify tags for units in the frame that indicate initializations for the process. Thus, the user may change an initialized tag for a current target unit to "NO" or "OFF" and change another initialized tag for a further target unit to "YES" or "ON". In this manner, the method 200 may accommodate features in which the user may change target units.

As a result of the unit being in view (decision 208, "YES" branch), the guidance server 130 may determine whether there is sufficient data that is available in the images to perform a three-dimensional registration. As those skilled in the art will understand, image registration may relate to a process of geometrically aligning a first image or frame (e.g., a current frame) with another image or frame (e.g., a previous frame such as an immediately prior frame). When performing image registration in three-dimensions, the geometric alignment may have an increased complexity as the alignment now incorporates a further dimension (e.g., depth). In the exemplary embodiments, the three-dimensional registration may be directed to the unit as captured in the images. Thus, the guidance server 130 may perform the three-dimensional registration by omitting other portions of the image and focusing on the geometric alignment of the unit from image to image.

In determining whether there is sufficient data in the images for the three-dimensional registration, the guidance server 130 may utilize points in the unit that are used for the geometric alignment. Based on a total number of points, the guidance server 130 may determine a number of points that are geometrically aligned between the two images. The guidance server 130 may determine a registration threshold based on a predetermined percentage of the total number of points. The predetermined percentage may be based on whether a two-dimensional transform function is capable of being calculated. As a result of the number of points being at least the registration threshold may be indicative that there is sufficient information in the images for the three-dimensional registration. As a result of the number of points being less than the registration threshold may be indicative that further operations may be required for the three-dimensional registration.

As a result of sufficient data in the images for the three-dimensional registration (decision 212, "YES" branch), the guidance server 130 may perform a transform function (step 214). Specifically, the guidance server 130 may perform a two-dimensional transform function. In performing the two-dimensional transform function, the guidance server 130 may utilize tracking information so that a pattern of movement may be determined to predict the unit's motion trajectory and determine a potential position of the unit in the images or camera view. In receiving the images from the user device 110, the guidance server 130 may utilize a current and a previous frame (e.g., an immediately prior frame). The images may have corresponding information associated therewith that may be included in a header, metadata, etc. of the image. For example, each image may include imager parameters (e.g., zoom level, angular orientation, etc.), an imager location in the real world scene (e.g., as a global position, in a relative position to the unit, etc.), a change in coordinates of the unit in the images or camera view, a time change between the two frames, etc. The guidance server 130 may utilize this information to determine a motion trajectory in the images or camera view. In determining the motion trajectory, the guidance server 130 may predict a location of the unit in subsequent images.

The guidance server 130 may utilize further operations in tracking the unit in the images. For example, the guidance server 130 may determine whether there is a pattern of movement of the unit or the movement is random. The guidance server 130 may determine a probability of movement of the unit in the images such that the probability being at least a pattern threshold may be indicative of the pattern of movement whereas the probability being less than the pattern threshold may be indicative of a random pattern. As a result of a discernible pattern of movement, the guidance server 130 may match the current frame and the previous frame (e.g., an immediately prior frame) to calculate a two-dimensional transform function. Those skilled in the art will understand the various ways for the two-dimensional transform function to be calculated. The exemplary embodiments may be modified to incorporate any of these mechanisms.

As a result of insufficient data in the images for the three-dimensional registration (decision 212, "NO" branch), the guidance server 130 may perform an image data augmentation operation (step 216). Specifically, the guidance server 130 may perform a three-dimensional data augmentation such that a two-dimensional transform function may be calculated and/or a three-dimensional registration may be determined. The three-dimensional data augmentation may be based on a relationship between a two-dimensional frame and the corresponding three-dimensions.

In an exemplary operation of the three-dimensional data augmentation, the guidance server 130 may perform a data pre-process operation. In the data pre-process operation, the guidance server 130 may select a three-dimensional model class such as one corresponding to the unit for which the task is to be performed. In an exemplary embodiment, the three-dimensional model class may be stored in the object model data 122 of the data repository 120. For the three-dimensional model class, the guidance server 130 may determine projected images in twenty six directions (e.g., (0,0,1), (0,1,0), (1,0,0), (1,1,1), (1,1,0), (1,0,1), (0,1,1), (−1,0,0) . . . ). The guidance server 130 may determine a data set including image coordinates (e.g., for a given image), color values (e.g., RGB), projection direction, etc. The guidance server 130 may also determining a mapping of corresponding partial three-dimensional points and two-dimensional coordinates in the projected image. The guidance server 130 may prepare this data to be used in subsequent operations. In this manner, the guidance server 130 may utilize a three-dimensional model to generate three-dimensional points (e.g., having three-dimensional coordinates) and/or to generate projected images including image coordinates and color values that are used to generate partial three-dimensional points.

In another exemplary operation of the three-dimensional data augmentation, the guidance server 130 may build models and extract low-dimensional ones of two-dimensional key features and three-dimensional key features. The guidance server 130 may use the three-dimensional point coordinates as a model input. With this model input, the guidance server 130 may use a partial three-dimensional encoder to determine a n-dimensional vector. With regard to "n", an encoder may convert high-dimensional features to a low dimensional feature vector where "n" may be determined by the encoder model. For example, for each object or unit, there may be a different "n" such as, for a complex unit, n may be 100, and for a simple unit, n may be 20 such that "n" may be set as a parameter to be trained when the model is prepared, and the criterion may be matched for efficiency and accuracy. Using a partial three-dimensional decoder, the guidance server 130 may transform the vector back to the input. The guidance server 130 may perform this training operation based on point cloud similarity. After training (e.g., until a sufficient confidence threshold is reached), the guidance server 130 may use a n-dimensional vector to represent a three-dimensional model that includes the projection direction information. The guidance server 130 may use a decoder to generate three-dimensional points corresponding to the projection direction image based on the n-dimensional vector. For two-dimensional data, the guidance server 130 may use a m-D vector to represent the projected image. Accordingly, for partial three-dimensional point coordinates, the guidance server 130 may use a partial three-dimensional encoder to generate a partial three-dimensional key feature vector that is fed to a partial three-dimensional decoder. For image coordinates and color, the guidance server 130 may use a two-dimensional encoder to generate two-dimensional key feature vector that is fed to a two-dimensional decoder. For three-dimensional point coordinates, the guidance server 130 may use a three-dimensional encoder to generate three-dimensional key feature vector that is fed to a three-dimensional decoder.

In a further exemplary operation of the three-dimensional data augmentation, the guidance server 130 may determine a relationship between the two-dimensional key features and the three-dimensional key features. Based on this relationship, the guidance server may generate the three-dimensional key features. Using the decoder that is trained in the manner described above, the guidance server 130 may receive a three-dimensional feature to generate three-dimensional points. In building the model to establish the dimensional relationship, the guidance server 130 may utilize the three-dimensional decoder for the three-dimensional model class as a discriminator. The guidance server 130 may utilize the two-dimensional key feature vector to determine the corresponding partial three-dimensional key feature vector. The guidance server 130 may incorporate a disturbance factor with the two-dimensional key feature as an input such that the partial three-dimensional key feature vector works as a ground truth. The disturbance factor may relate to the projection direction. For example, the same three-dimensional points may be projected into different directions resulting in different images that may be used to map the same three-dimensional points (e.g., use key feature vector to represent the images to do the calculation) where a well-trained model may have a poor generalization. Accordingly, the disturbance factor related to the projected direction may be used to allow the model to be more robust. The guidance server 130 may train a deep neural network by changing the disturbance factor as related to a projection direction. After training the deep neural network, the guidance server may utilize the resulting model to generate three-dimensional points based on a two-dimensional feature vector. In this manner, the guidance server 130 may perform three-dimensional data augmentation for a three-dimensional registration even under conditions where the images do not include sufficient information for three-dimensional registration to be performed using conventional approaches.

Whether or not the guidance server 130 had sufficient information to perform the three-dimensional registration, the guidance server 130 may be equipped to perform the three-dimensional registration and determine an appropriate transform function (step 218). If the guidance server 130 determined that sufficient information was available in the images, the guidance server 130 may perform a continuous three-dimensional registration. The continuous three-dimensional registration may utilize inputs including the two-dimensional transform function, the changes in the imager parameters (e.g., position and/or location of the imager), and a previously used three-dimensional transform function (e.g., an immediately prior three-dimensional transform function). The guidance server 130 may utilize a current frame and a previous frame (e.g., an immediately prior frame) to calculate the two-dimensional transform function. As sufficient information is available, the guidance server 130 may calculate the two-dimensional transform function in any manner as one skilled in the art would understand. The changes in the imager parameters may be determined based on a current value and a previous value (e.g., a previous position versus a current position, previous color values versus current color values, etc.). Using the above noted inputs, the guidance server 130 may determine a three-dimensional transform function for the current frame. If the guidance server 130 determined that insufficient information was available in the images, the guidance server 130 may perform a three-dimensional registration through the available and/or determined information described above. For example, the three-dimensional points that are determined through three-dimensional data augmentation for the current frame may be used with corresponding three-dimensional points of the previous frame to perform the three-dimensional registration.

Using the three-dimensional transform function, the guidance server 130 may determine a manner in which to generate annotations on the unit and/or task for the mixed reality environment (step 220). For example, the annotation data library 124 may include personalized annotations for the user performing the task on the unit. The personalized annotations may be for individual components of the unit. In one manner, the annotation data library 124 may include labels for the components of the unit. The labels may be textual labels for the user to read and identify the components. The annotations may also be associated with a three-dimensional model of the unit. By applying the three-dimensional transform function, the guidance server 130 may determine a manner of modifying the three-dimensional model to how the user is viewing the unit. That is, the three-dimensional model of the unit as associated with the annotations in the annotation data library 124 may be modified to match a three-dimensional model of the unit corresponding to the manner that the user is viewing the unit in the real world scene. The modified model determined with the three-dimensional transform function may provide a corresponding change to how the annotations are to be provided. The guidance server 130 may generate the annotations in a modified manner to correspond to the user viewing the unit in the real world scene.

The guidance server 130 may perform further operations to adjust the manner in which to generate and show the annotations in the mixed reality environment based on the three-dimensional transform function. For example, the guidance server 130 may determine coordinates of a three-dimensional point on the three-dimensional model of the unit for which an annotation may be provided. The coordinates may indicate whether the three-dimensional point is on a foreground or occluded. Based on the relative depth of the three-dimensional point, the guidance server 130 may modify the manner in which the annotation is to be generated. For example, for annotations in the foreground, the guidance server 130 may present the annotation on the component of the unit (e.g., a textual annotation, a numerical annotation with a legend defining the numerical annotation) or present the annotation near the component of the unit with a line pointing to the component of the unit. In another example, for annotations that are occluded, the guidance server 130 may show an appropriate indicator so that the user does not confuse the annotation with another component (e.g., a component in the foreground). The guidance server 130 may utilize any visual adjustment such as a dashed line connecting the annotation to the component to indicate the component is occluded at the current perspective, a different font or color of the annotation to indicate the component is occluded at the current perspective, etc.

The guidance server 130 may continue to show the annotations utilizing the above mechanism so long as the guidance server 130 receives images from the user device 110. Thus, the guidance server 130 determines whether a further image is to be processed (decision 222). As a result of at least one further image being received (decision 222, "YES" branch), the guidance server 130 may continue to process the images and provide annotations in the manner described above. As a result of no further images being received (decision 222, "NO" branch), the guidance server 130 may terminate further processing. The guidance server 130 may continue to show a last presentation of the annotations until a subsequent event (e.g., the user deactivates the user device 110).

The exemplary embodiments are configured to generate annotations that is provided to a user in a mixed reality environment to identify components of a unit and/or steps of a task to be performed on the unit such that the user may perform the task with self guidance. The exemplary embodiments are configured to compensate for challenges associated with three-dimensional registration that is used in generating the annotations in a dynamic manner so that the annotations properly identify its respective item even as the user's perspective changes. The exemplary embodiments include an annotation data library with model, user, and/or field related information so that customized annotation information may be provided for different users and/or units or assets. The exemplary embodiments may initialize the process by identifying the unit that is targeted to be tracked and provided corresponding annotations. In tracking the unit through images corresponding to the user's perspective, the exemplary embodiments may determine the unit's trajectory and utilize other information (e.g., imager parameters) to predict a potential location of the unit in the user's view. In conditions where consecutive images provide sufficient information to calculate a three-dimensional transform function, the exemplary embodiments may perform a continuous three-dimensional registration. In conditions where consecutive images provide insufficient information such as when the consecutive frames do not provide sufficient three-dimensional points in which to geometrically align, the exemplary embodiments may perform a three-dimensional data augmentation to extend the three-dimensional points that determine key features for each model related data and build up a relationship between key features of two-dimensional images and three-dimensional points. The exemplary embodiments may thereby use this dimensional relationship to augment three-dimensional points and result in a three-dimensional registration and transform function. In either manner, the exemplary embodiments may use the three-dimensional transform function to determine the manner in which to generate and show the annotations in the mixed reality environment as viewed by the user.

Figure 3:
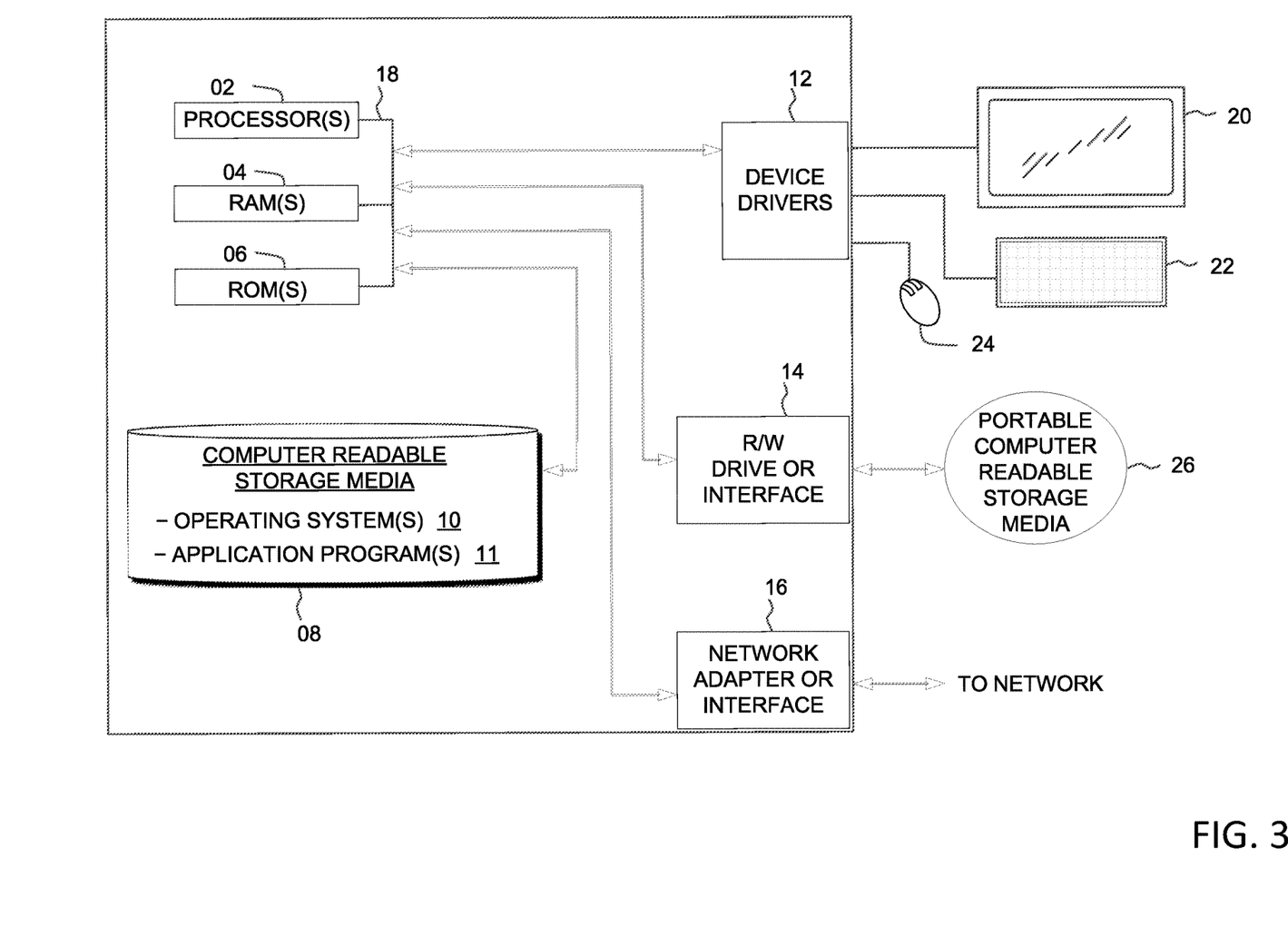
FIG. 3 depicts an exemplary block diagram depicting the hardware components of the self-guidance system 100 of FIG. 1, in accordance with the exemplary embodiments.

FIG. 3 depicts a block diagram of devices within the self-guidance system 100 of FIG. 1, in accordance with the exemplary embodiments. It should be appreciated that FIG. 3 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
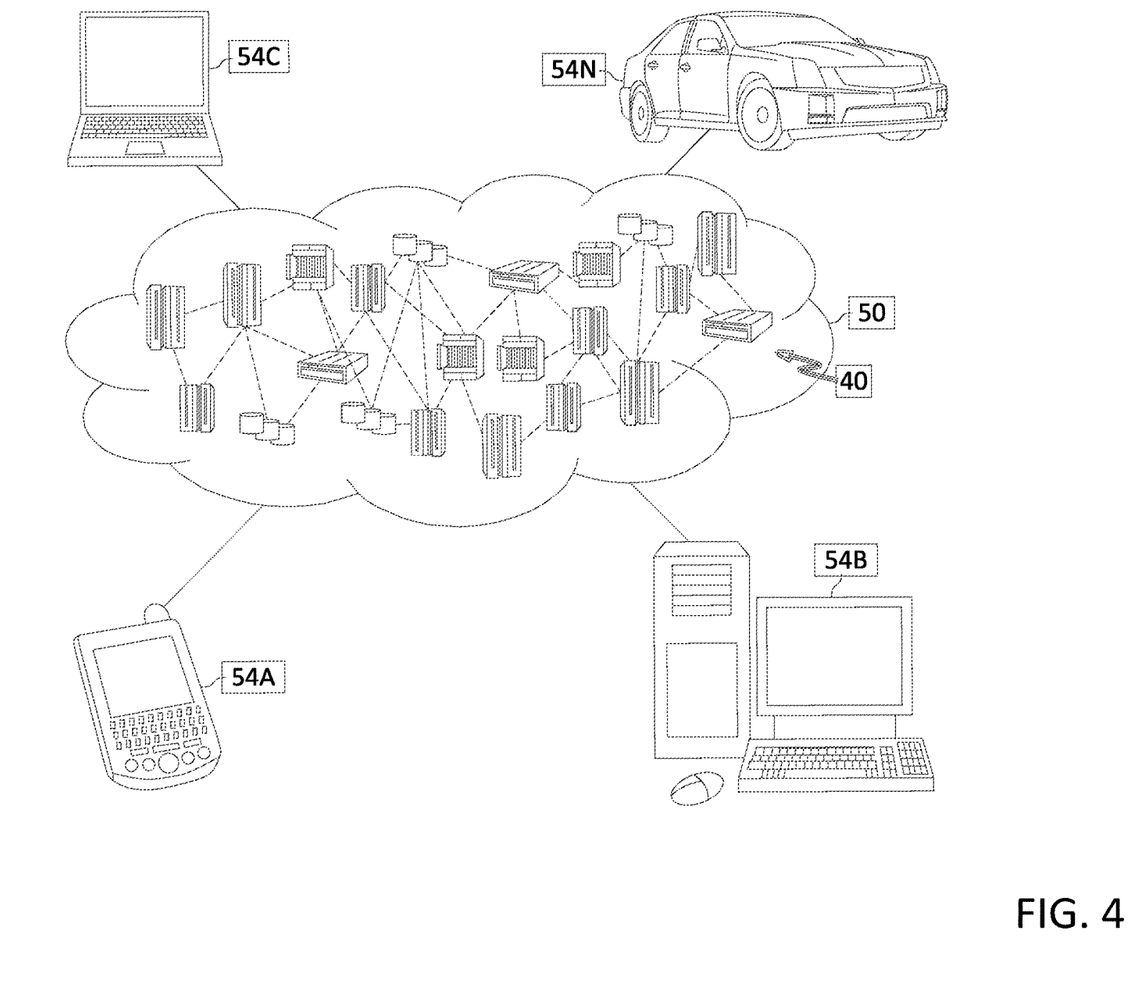
FIG. 4 depicts a cloud computing environment, in accordance with the exemplary embodiments.

Referring now to FIG. 4, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 40 and cloud computing environment 50 can communicate with any type of computerized device over any type of network and/or network addressable connection (e.g., using a web browser).

Figure 5:
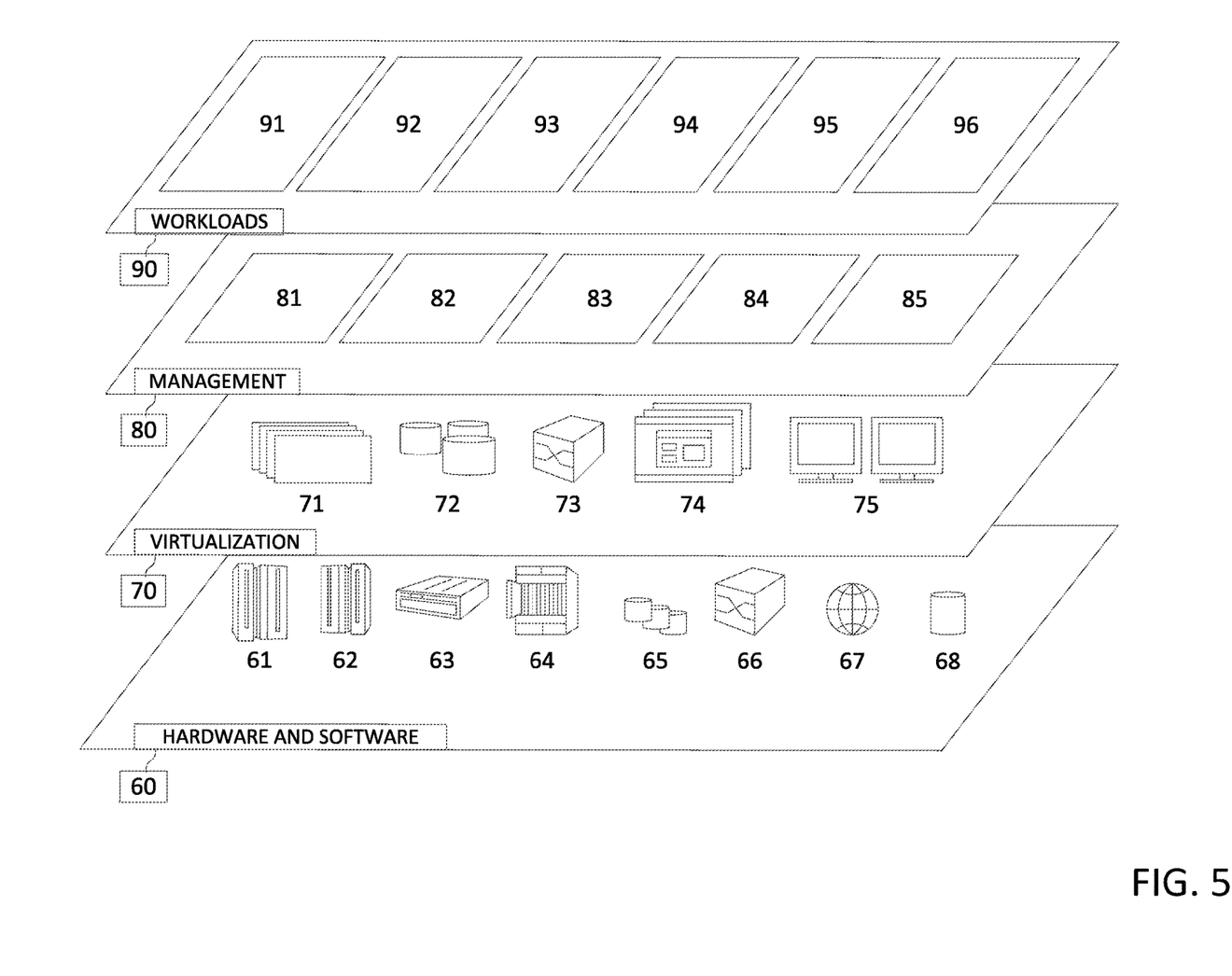
FIG. 5 depicts abstraction model layers, in accordance with the exemplary embodiments.

Referring now to FIG. 5, a set of functional abstraction layers provided by cloud computing environment 50 (FIG. 4) is shown. It should be understood in advance that the components, layers, and functions shown in FIG. 5 are intended to be illustrative only and the exemplary embodiments are not limited thereto. As depicted, the following layers and corresponding functions are provided:

Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and guidance processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for guiding a user through dimensional relationships, the method comprising:
   receiving a plurality of images from a user device utilized by a user performing a task on a unit, the images corresponding to a perspective that the user is viewing the unit;
   determining whether a current image of the images and a previous image of the images include a number of corresponding three-dimensional points geometrically aligning the current image and the previous image that is at least a registration threshold to perform a three-dimensional registration operation;
   as a result of the number of corresponding three-dimensional points being less than the registration threshold, performing a three-dimensional data augmentation operation based on two-dimensional data from the current image and the previous image to generate extended corresponding three-dimensional points;
   determining a three-dimensional transform function between the current image and the previous image based on the extended corresponding three-dimensional points; and
   generating annotations to be shown for the unit in the current image based on the three-dimensional transform function, the annotations being shown as a virtual rendering in a mixed reality environment viewed by the user.

2. The computer-implemented method of claim 1, wherein the previous image is an immediately prior image relative to the current image.

3. The computer-implemented method of claim 1, further comprising:
   determining a trajectory of the unit in the perspective that the user is viewing the unit between the current image and the previous image.

4. The computer-implemented method of claim 3, wherein the determining the three-dimensional transform function is further based on the trajectory.

5. The computer-implemented method of claim 1, further comprising:
   determining changes between the current image and the previous image in at least one of coordinates of three-dimensional points of the unit and imager parameters capturing the images.

6. The computer-implemented method of claim 5, wherein the determining the three-dimensional transform function is further based on the changes.

7. The computer-implemented method of claim 1, wherein the annotations are personalized for the user.

8. A non-transitory computer-readable storage media that configures a computer to perform program instructions stored on the non-transitory computer-readable storage media, the program instructions comprising:
   receiving a plurality of images from a user device utilized by a user performing a task on a unit, the images corresponding to a perspective that the user is viewing the unit;
   determining whether a current image of the images and a previous image of the images include a number of corresponding three-dimensional points geometrically aligning the current image and the previous image that is at least a registration threshold to perform a three-dimensional registration operation;
   as a result of the number of corresponding three-dimensional points being less than the registration threshold, performing a three-dimensional data augmentation operation based on two-dimensional data from the current image and the previous image to generate extended corresponding three-dimensional points;
   determining a three-dimensional transform function between the current image and the previous image based on the extended corresponding three-dimensional points; and
   generating annotations to be shown for the unit in the current image based on the three-dimensional transform function, the annotations being shown as a virtual rendering in a mixed reality environment viewed by the user.

9. The non-transitory computer-readable storage media of claim 8, wherein the previous image is an immediately prior image relative to the current image.

10. The non-transitory computer-readable storage media of claim 8, wherein the instructions further comprise:
    determining a trajectory of the unit in the perspective that the user is viewing the unit between the current image and the previous image.

11. The non-transitory computer-readable storage media of claim 10, wherein the determining the three-dimensional transform function is further based on the trajectory.

12. The non-transitory computer-readable storage media of claim 8, wherein the instructions further comprise:
    determining changes between the current image and the previous image in at least one of coordinates of three-dimensional points of the unit and imager parameters capturing the images.

13. The non-transitory computer-readable storage media of claim 12, wherein the determining the three-dimensional transform function is further based on the changes.

14. The non-transitory computer-readable storage media of claim 8, wherein the annotations are personalized for the user.

15. A computer system for guiding a user through dimensional relationships, the computer system comprising:
    one or more computer processors, one or more computer-readable storage media, and program instructions stored on the one or more of the computer-readable storage media for execution by at least one of the one or more processors capable of performing a method, the method comprising:
receiving a plurality of images from a user device utilized by a user performing a task on a unit, the images corresponding to a perspective that the user is viewing the unit;
determining whether a current image of the images and a previous image of the images include a number of corresponding three-dimensional points geometrically aligning the current image and the previous image that is at least a registration threshold to perform a three-dimensional registration operation;
as a result of the number of corresponding three-dimensional points being less than the registration threshold, performing a three-dimensional data augmentation operation based on two-dimensional data from the current image and the previous image to generate extended corresponding three-dimensional points;
determining a three-dimensional transform function between the current image and the previous image based on the extended corresponding three-dimensional points; and
generating annotations to be shown for the unit in the current image based on the three-dimensional transform function, the annotations being shown as a virtual rendering in a mixed reality environment viewed by the user.

16. The computer system of claim 15, wherein the previous image is an immediately prior image relative to the current image.

17. The computer system of claim 15, wherein the method further comprises:
determining a trajectory of the unit in the perspective that the user is viewing the unit between the current image and the previous image.

18. The computer system of claim 17, wherein the determining the three-dimensional transform function is further based on the trajectory.

19. The computer system of claim 15, wherein the method further comprises:
determining changes between the current image and the previous image in at least one of coordinates of three-dimensional points of the unit and imager parameters capturing the images.

20. The computer system of claim 19, wherein the determining the three-dimensional transform function is further based on the changes.

* * * * *